United States Patent [19]

Repperger

[11] Patent Number: 5,353,226
[45] Date of Patent: Oct. 4, 1994

[54] CORIOLIS INDICATOR FOR SITUATIONAL AWARENESS

[75] Inventor: Daniel W. Repperger, Dayton, Ohio

[73] Assignee: The United states of America as represented by the Secretary of the Air Force, Washington, D.C.

[21] Appl. No.: 934,226

[22] Filed: Aug. 25, 1992

[51] Int. Cl.$^5$ .............................................. G01P 9/04
[52] U.S. Cl. ...................... 364/433; 73/505; 73/510; 364/578
[58] Field of Search ................... 364/433, 578; 73/510, 73/505

[56] References Cited

U.S. PATENT DOCUMENTS

| | | | |
|---|---|---|---|
| 2,371,626 | 3/1945 | Kecskemeti | 175/183 |
| 4,133,503 | 1/1979 | Bliss | 244/188 |
| 4,297,673 | 10/1981 | Green | 340/27 |
| 4,445,376 | 5/1984 | Merhav | 73/510 |
| 4,520,669 | 6/1985 | Rider | 73/510 |
| 4,522,062 | 6/1985 | Peters | 73/505 |
| 4,751,662 | 6/1988 | Crosbie | 364/578 |
| 4,841,773 | 6/1989 | Stewart | 73/510 |
| 4,870,588 | 9/1989 | Merhav | 364/453 |
| 5,021,982 | 6/1991 | Crosbie et al. | 364/578 |
| 5,168,756 | 12/1992 | Hulsing, II | 73/505 |

OTHER PUBLICATIONS

"A Study of Supermaneuverable Flight Trajectories Through Motion Field Simulation of a Centrifuge Simulator", by D. W. Reppenger J. Dynamic Systems, Measurment and Control, 144:6, 271 (Jun. 1992).

*Primary Examiner*—Thomas G. Black
*Assistant Examiner*—Susan Wieland
*Attorney, Agent, or Firm*—Bobby D. Scearce; Thomas L. Kundert

[57] ABSTRACT

A system for indicating the presence of Coriolis accelerations within an aircraft which might affect pilot perception of aircraft attitude and spatial orientation, which comprises sensors for measuring vehicle angular position, rotations and velocities operatively connected to an onboard computer program which calculates the Coriolis accelerations according to an analysis presented herein and presented on a display to the pilot.

2 Claims, 3 Drawing Sheets

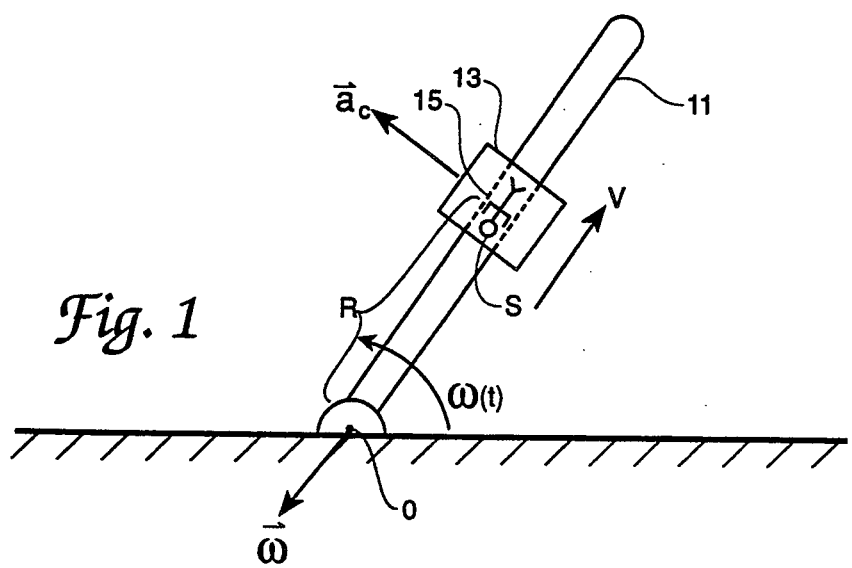
*Fig. 1*
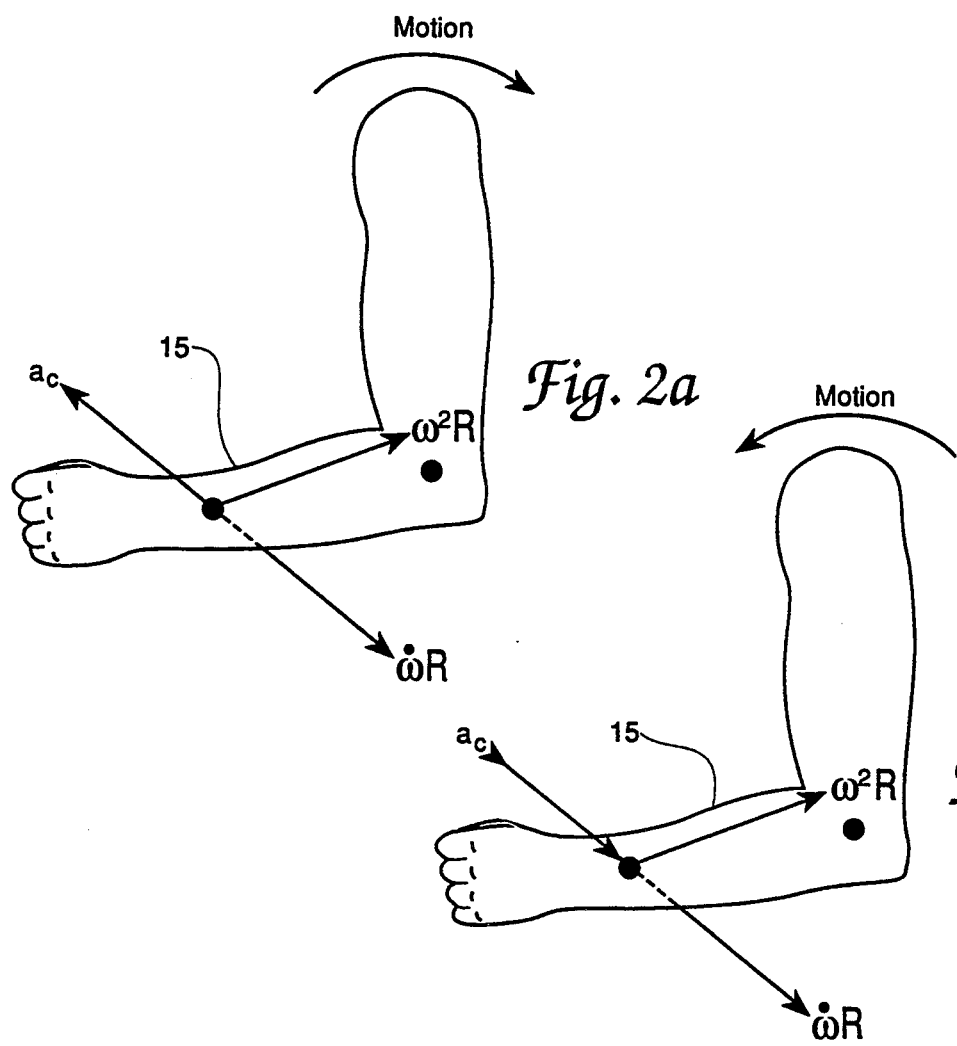
*Fig. 2a*
*Fig. 2b*

CORIOLIS INDICATOR FOR SITUATIONAL AWARENESS

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for providing situational information to an aircraft pilot, and more particularly to a system for indicating presence of Coriolis forces in providing to an aircraft pilot information about aircraft acceleration and attitude.

Development of supermaneuverable fighter aircraft has made acute a requirement to monitor unusual aircraft accelerations which may alter pilot perception of aircraft attitude. No existing systems provide this type of motion information to enhance aircraft situational awareness in the pilot.

The invention solves or substantially reduces in critical importance shortcomings in the prior art by providing a Coriolis indicator for displaying information to enhance the situational awareness of a pilot when training in a motion simulator, when flying an aircraft under limited vision, or when the aircraft performs unusual maneuvers where Coriolis accelerations occur.

It is therefore a principal object of the invention to provide an indicator for defining Coriolis accelerations in the operation of a motion simulator.

It is another principal object of the invention to provide to an aircraft pilot an indicator of situational information defining Coriolis accelerations on the aircraft.

It is a further object of the invention to provide to an aircraft pilot information about accelerations acting on the aircraft to allow ascertainment of true aircraft attitude.

It is yet another object of the invention to provide a method for determining and displaying situational information defining Coriolis accelerations in the operation of an aircraft or motion simulator.

These and other objects of the invention will become apparent as a detailed description of representative embodiments proceeds.

SUMMARY OF THE INVENTION

In accordance with the foregoing principles and objects of the invention, a system is described for indicating the presence of Coriolis accelerations within an aircraft which might affect pilot perception of aircraft attitude and spatial orientation, which comprises sensors for measuring vehicle angular position, rotations and velocities operatively connected to an onboard computer program which calculates the Coriolis accelerations according to an analysis presented herein and presented on a display to the pilot.

DESCRIPTION OF THE DRAWINGS

The invention will be more clearly understood from the following detailed description of representative embodiments thereof read in conjunction with the accompanying drawings wherein:

FIG. 1 is a diagram illustrating the classical Coriolis acceleration effects on a moving system;

FIGS. 2a and 2b illustrate accelerations acting on a subjects forearm according to the motion described with respect to FIG. 1;

DETAILED DESCRIPTION

Figure 3:
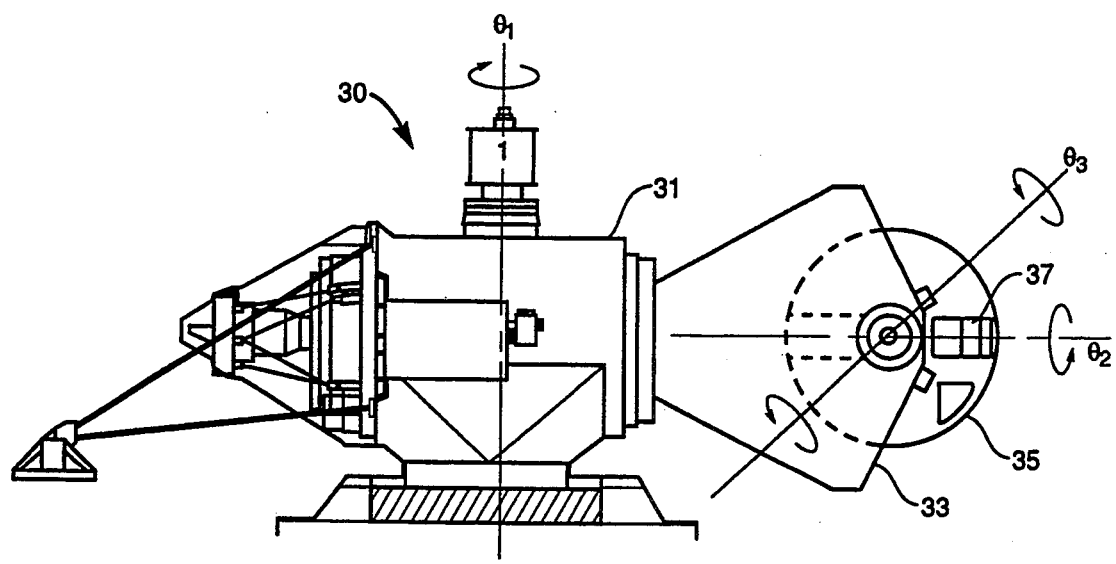
FIG. 3 illustrates a three-axis centrifuge simulator which can produce induced Coriolis accelerations.

Theoretical considerations on flight trajectories of aircraft utilizing a motion simulator are presented in "A Study of Supermaneuverable Flight Trajectories Through Motion Field Simulation of a Centrifuge Simulator", by D. W. Repperger, Journal of Dynamic Systems, Measurement and Control, 144:6 (June 1992), the entire teachings of which are incorporated by reference herein.

Referring now to FIG. 1, shown therein is a drawing illustrating classical Coriolis acceleration effects in a set of moving coordinate systems. Radial arm 11 moves with angular velocity $\omega(t)$ about an axis O. Member 13 slides on radial arm 11 with velocity v directed along arm 11. The vector $\omega$ is directed vertically out of the plane of FIG. 1 (right hand rule), and the induced Coriolis acceleration $\vec{a}_c$ on member 13 is directed as shown in FIG. 1 and related to the vector cross product of $\omega$ and $\vec{v}$ as follows:

$$\vec{a}_c = 2\vec{\omega} \times \vec{v} \quad (1)$$

The direction of $\vec{a}_c$ may give rise to situational misperceptions in a person on which $\vec{a}_c$ acts. If subject S is positioned on arm 11 and moves his forearm 15 (with upper arm locked) first with a motion in the direction opposite $\vec{v}$ and then in a direction with $\vec{v}$, different effects occur as a result of the two motions. FIGS. 2a, 2b illustrate the accelerations acting on forearm 15 when subject S moves the forearm with these two respective motions. When forearm 15 is moved in the direction opposite $\vec{v}$ (FIG. 2a), the induced Coriolis acceleration on forearm 15 is parallel to $\vec{a}_c$ acting on member 13, which results in a force tending to pull forearm 15 to the subject's right. In FIG. 2a, the centripetal component of the induced acceleration is $\omega^2 R$ and the tangential component is $[d/dt\, \omega(t)]R$; the induced Coriolis acceleration subtracts from the tangential acceleration induced on forearm 15. If $\omega(t)$ is constant, the tangential component is zero. FIG. 2b illustrates that when forearm 15 is extended, the induced Coriolis acceleration is reversed in direction and acts to add to the tangential acceleration, which results in a force tending to pull forearm 15 to the subject's left.

The forces on forearm 15 resulting from motions described in relation to FIGS. 2a, 2b are representative of the complex forces produced in a coordinate system (frame of reference) subjected to Coriolis accelerations and may produce excessive physical and mental disturbances in a subject within that frame of reference. FIGS. 1, 2a, 2b further illustrate that Coriolis accelerations occur only when one coordinate system (e.g., member 13) moves relative to another moving coordinate system (e.g., radial arm 11).

Referring now to FIG. 3, shown therein is an illustration of the induced Coriolis accelerations in a three-axis centrifuge simulator 30. In simulator 30, motion may be defined around axes $\theta_1$, $\theta_2$, $\theta_3$. Only when one axis moves relative to another axis will Coriolis accelerations be induced.

In FIG. 3, centrifuge arm 31 rotates about axis $\theta_1$, and fork 33 is attached to arm 31 for rotation about pitch axis 82 along arm 31 normal to axis $\theta_1$. Cab 35 is gimballed within fork 33 for rotation about roll axis $\theta_3$ normal to axis $\theta_2$ and contains a seat 37 for receiving a subject S seated therein and looking normally toward the center of arm 31 rotation (axis $\theta_1$). If centrifuge arm 31 rotates about axis $\theta_1$ at $\omega_1(t) > 0$, and fork 33 moves about axis $\theta_2$ at $\omega_2(t) \neq 0$, then a Coriolis induced acceleration appears at seat 37 and affects subject S. If cab 35 moves at $\omega_3(t) \neq 0$ within moving fork 33, then another Coriolis acceleration results from the relative motion between cab 35 and fork 33. If subject S makes a sudden body movement within rotating cab 35, a third Coriolis acceleration is induced by subject S body movements within yet another moving coordinate system. The third Coriolis acceleration component is small with magnitude $2\bar{\omega}_3 \times \vec{v}_b$, where $\vec{v}_b$ is the velocity vector of the body movement. In practice both $\omega_3(t)$ of the cab and $v_b$ of the body movement are small compared to $\omega_1(t)$ and $\omega_2(t)$ of arm 31 and fork 33 and therefore produce minimum disturbance.

Figure 4:
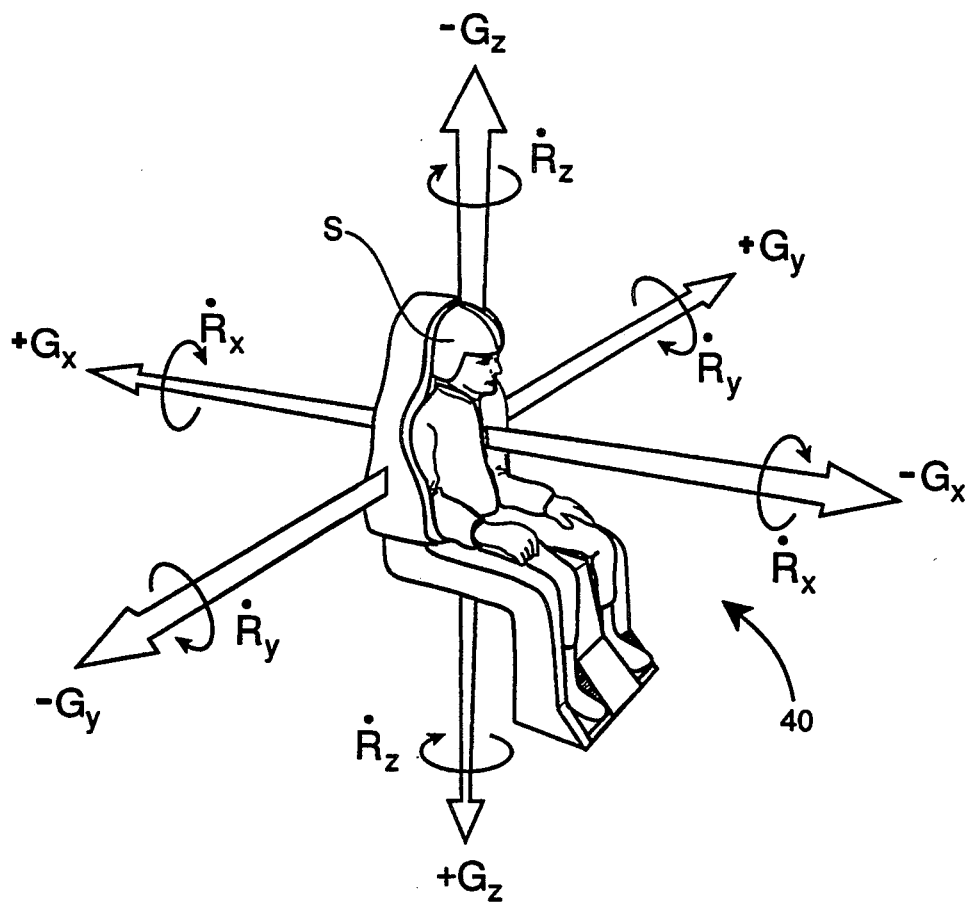
FIG. 4 defines a body axis coordinate system considered herein.

Consider now additionally FIG. 4 which defines a body axis coordinate system 40 for consideration herein. It can be easily shown that if coordinate system 40 is used to describe rotations and linear accelerations of subject S within cab 35 of simulator 30, the total motion $\bar{\omega}$ acting on coordinate system 40 is given by following relationship:

$$\bar{\omega} = A_o(t)\bar{i}_o + B_o(t)\bar{j}_o + C_o(t)\bar{K}_o \quad (2)$$

where $\bar{i}_o, \bar{j}_o, \bar{k}_o$ are unit vectors in the inertial frame coordinate system at the base of simulator 30. The coefficient matrices $A_o(t)$, $B_o(t)$, $C_o(t)$ define the various interactions of angular velocities in one reference frame (i.e., arm 31, fork 33, cab 35) moving with respect to another, and are given by:

$$A_o(t) = A_c + A_{nc} \quad (3)$$

$$B_o(t) = B_c + B_{nc} \quad (4)$$

$$C_o(t) = C_c + C_{nc} \quad (5)$$

where $A_c$, $B_c$, $C_c$ refer to the Coriolis induced accelerations in the x,y,z axes in coordinate system 40. The terms $A_{nc}$, $B_{nc}$, $C_{nc}$ are the non-Coriolis terms (gravity induced, centripetal, or tangential terms). For example, it can be shown that:

$$A_c = -\dot{\theta}_2\dot{\theta}_1 s_1 - \dot{\theta}_3\dot{\theta}_1 c_1 c_2 + \dot{\theta}_3\dot{\theta}_2 s_1 s_2 \quad (6)$$

$$B_c = -\dot{\theta}_2\dot{\theta}_1 c_1 + \dot{\theta}_3\dot{\theta}_1 s_1 c_2 + \dot{\theta}_3\dot{\theta}_2 c_1 s_2 \quad (7)$$

$$C_c = -\dot{\theta}_3\dot{\theta}_2 c_2 \quad (8)$$

where $c_i$, $s_i$ (i = 1, 2) are shorthand representations for sine and cosine of angle i and $\dot{\theta}_1, \dot{\theta}_2, \dot{\theta}_3$ are time derivatives of $\theta_1, \theta_2, \theta_3$ (i.e. angular velocities). Therefore, measurement of appropriate rotations and velocities for simulator 30 allows calculation of coefficient matrices $A_o(t)$, $B_o(t)$, $C_o(t)$ according to Eqs (3),(4), (5), and of the unusual accelerations $A_c$, $B_c$, $C_c$ according to Eqs (6),(7),(8).

Results of the foregoing analysis may extrapolated in order to derive equations of motion describing an aircraft corresponding to Eqs (2) through (8). Equations of motion for the aircraft are different from those for simulator 30 because they depend on such factors as the position of the pilot seat from the center of gravity of the aircraft and on accurate measurement of aircraft rotations and velocities. For the aircraft however, it is necessary to measure rotations by integration of the 3 axes gyroscopic signals. This provides accurate attitude information (true aircraft rotation, attitude, velocity and acceleration). One way to define the functional relationships describing motion of the aircraft and forces acting on the aircraft may be as follows:

$$\theta_{roll} = F_1(\text{speed, altitude, drag forces, air density, etc}) \quad (9)$$

$$\theta_{pitch} = F_2(\text{speed, altitude, drag forces, air density, etc}) \quad (10)$$

$$\theta_{yaw} = F_3(\text{speed, altitude, drag forces, air density, etc}) \quad (11)$$

$$G_x = F_4(\text{speed, altitude, drag forces, air density, etc}) \quad (12)$$

$$G_y = F_5(\text{speed, altitude, drag forces, air density, etc}) \quad (13)$$

$$G_z = F_6(\text{speed, altitude, drag forces, air density, etc}) \quad (14)$$

where $\theta_{roll}, \theta_{pitch}, \theta_{yaw}$ refer to the roll, pitch and yaw rotation axes of an aircraft. The functions $F_1$ through $F_6$ depend on many factors describable only with respect to a specific aircraft and may vary from aircraft to aircraft, depending on aircraft type, and as may be developed by one skilled in the applicable art. In the supermaneuverable flight regime, one or more of the functions may not be susceptible of expression with specificity, however, the invention relies only on measurements of variables suggested in Eqs (9)–(14) such as by way of gyroscopic signals. Therefore, in accordance with the analysis presented above, the Coriolis accelerations can be determined even if the functions $F_1$ through $F_6$ are not known with specificity in normal flight regimes.

Figure 5:
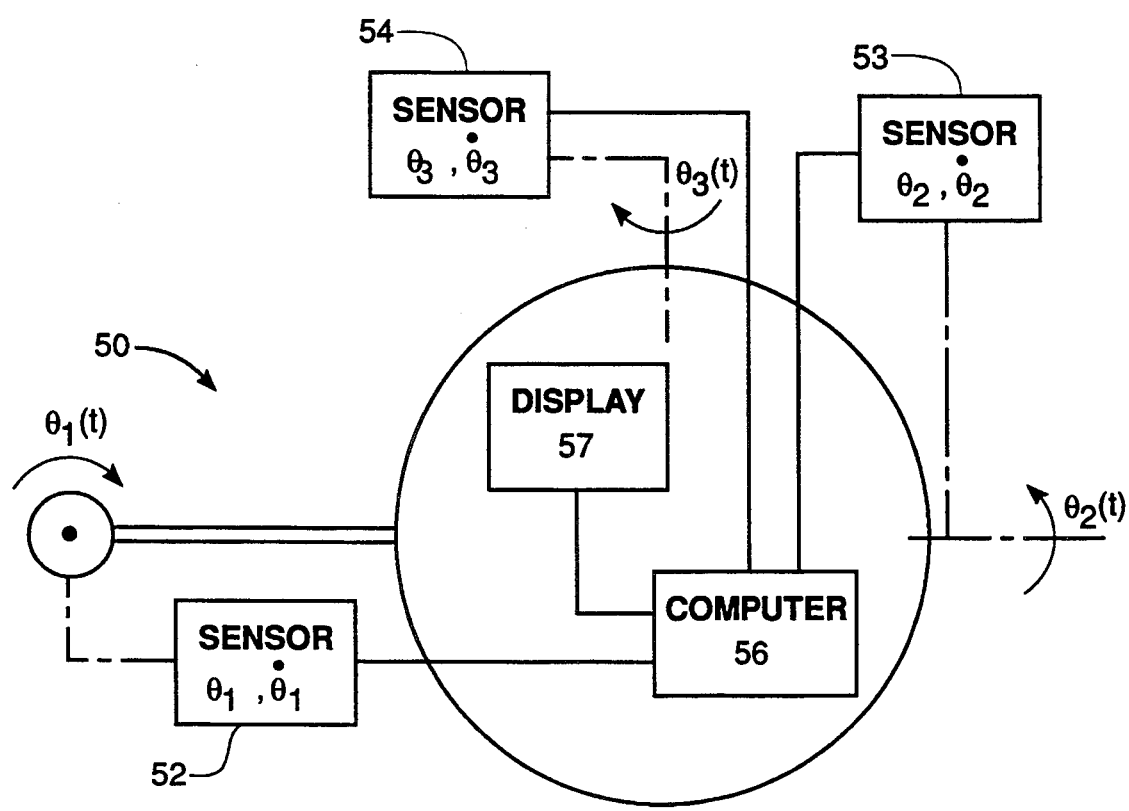
FIG. 5 is a block diagram of the essential elements of a system for practicing the invention herein.

Referring now additionally to FIG. 5, shown therein is a block diagram of the essential elements of a system for practicing the invention. In the practice of the invention, motion of vehicle 50 (simulator or aircraft) may be defined as presented above in terms of $\dot{\theta}_1, \dot{\theta}_2, \dot{\theta}_3$. Sensors 52,53,54 such as in the form of pohelmis (magnetic) position sensors, resolvers, potentiometers or optical encoders for measurement of $\theta_i$ (i = 1,3), and digital velocity indicators or tachometers for measurement of velocities $\dot{\theta}_i$ (i = 1,3) operatively interconnect vehicle 50 and onboard computer 56 for the calculation of Coriolis accelerations affecting vehicle 50 as suggested in the analysis presented above. The Coriolis variables $G_x$, $G_y$, $G_z$, along with $\theta_i$ (i = 1,3), $\dot{\theta}_i$ (i = 1,3) are presented to subject S (pilot or simulator operator) on display 57, which may comprise an alarm system to alert the pilot to the potentially dangerous situation. Since Coriolis accelerations cannot be distinguished from any other accelerations induced via simulator (or aircraft) motion, determinations of Coriolis accelerations according to the relationships described above depend on measured joint positions and velocities as an indicator of relative Coriolis accelerations appearing in coordinate system 40 which affect subject S (the pilot). Display 57 therefore informs subject S as to what accelerations he might feel result from unusual sources of acceleration.

The invention therefore provides system and method for displaying Coriolis accelerations in the operation of an aircraft or motion simulator which might impair perception of spatial orientation. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

I claim:

1. A system for indicating the presence of Coriolis accelerations in a moving vehicle, comprising:
   (a) a plurality of sensors for measuring angular displacement and angular velocity of a vehicle in a first coordinate system defining said vehicle relative to a second coordinate system relative to which said vehicle moves, said plurality of sensors including means for providing signals defining the measured angular displacements and angular velocities;
   (b) means for analyzing said signals and for determining from said measured angular displacements and angular velocities of said vehicle any Coriolis acceleration acting within said vehicle; and
   (c) means for displaying any said Coriolis acceleration acting within said vehicle.

2. The system of claim 1 wherein said plurality of sensors consist of magnetic position sensors, resolvers, potentiometers or optical encoders for measuring angular displacement relative to said second coordinate system, and consist of digital velocity indicators or tachometers for measurement of angular velocity relative to said second coordinate system.

* * * * *